(12) United States Patent
Prima et al.

(10) Patent No.: US 8,720,945 B2
(45) Date of Patent: May 13, 2014

(54) GAS GENERATOR AND ITS MANUFACTURING PROCESS

(75) Inventors: Gérald Prima, Landrevarzec (FR);
Sébastien Kermarrec, Briec (FR);
Maxime Lejeune, Gouezec (FR);
Philippe Moullec, Saint Urbain (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/641,304

(22) PCT Filed: Apr. 15, 2011

(86) PCT No.: PCT/EP2011/056049
§ 371 (c)(1),
(2), (4) Date: Oct. 15, 2012

(87) PCT Pub. No.: WO2011/131590
PCT Pub. Date: Oct. 27, 2011

(65) Prior Publication Data
US 2013/0039814 A1    Feb. 14, 2013

(30) Foreign Application Priority Data

Apr. 20, 2010 (FR) ...................................... 10 52996

(51) Int. Cl.
*B60R 21/264* (2006.01)
(52) U.S. Cl.
USPC ............................ 280/741; 280/736; 102/530
(58) Field of Classification Search
USPC ................... 280/741, 737, 736; 102/530, 531
See application file for complete search history.

(56) References Cited

U.S. PATENT DOCUMENTS

| 6,244,623 B1 | 6/2001 | Moore |
| 6,439,604 B1 * | 8/2002 | Al-Amin et al. ............... 280/736 |
| 2004/0201208 A1 * | 10/2004 | Longhurst et al. ............ 280/741 |
| 2009/0115175 A1 | 5/2009 | Nishimura et al. |

FOREIGN PATENT DOCUMENTS

| EP | 1775179 A2 | 4/2007 |
| EP | 1935726 A1 | 6/2008 |
| FR | 2907732 A1 | 5/2008 |
| WO | 03/072381 A2 | 9/2003 |

OTHER PUBLICATIONS

International Search Report and Written Opinion of the ISA for PCT/EP2011/056049, ISA/EP, Rijswijk, NL, mailed Jun. 16, 2011.

* cited by examiner

*Primary Examiner* — Keith Frisby
(74) *Attorney, Agent, or Firm* — Harness, Dickey & Pierce, P.L.C.

(57) ABSTRACT

A gas generator includes a pyrotechnic charge contained in a chamber delimited by a wall and by two transversal walls. At least one of the walls comprises at least one through hole. A covering sheet in the form of a box is located facing the through hole. A seal gasket is provided between the sheet and one of the walls. The seal gasket is positioned between the first tubular part of the covering sheet and the wall for ensuring the seal between the box and the wall towards the through hole.

24 Claims, 4 Drawing Sheets

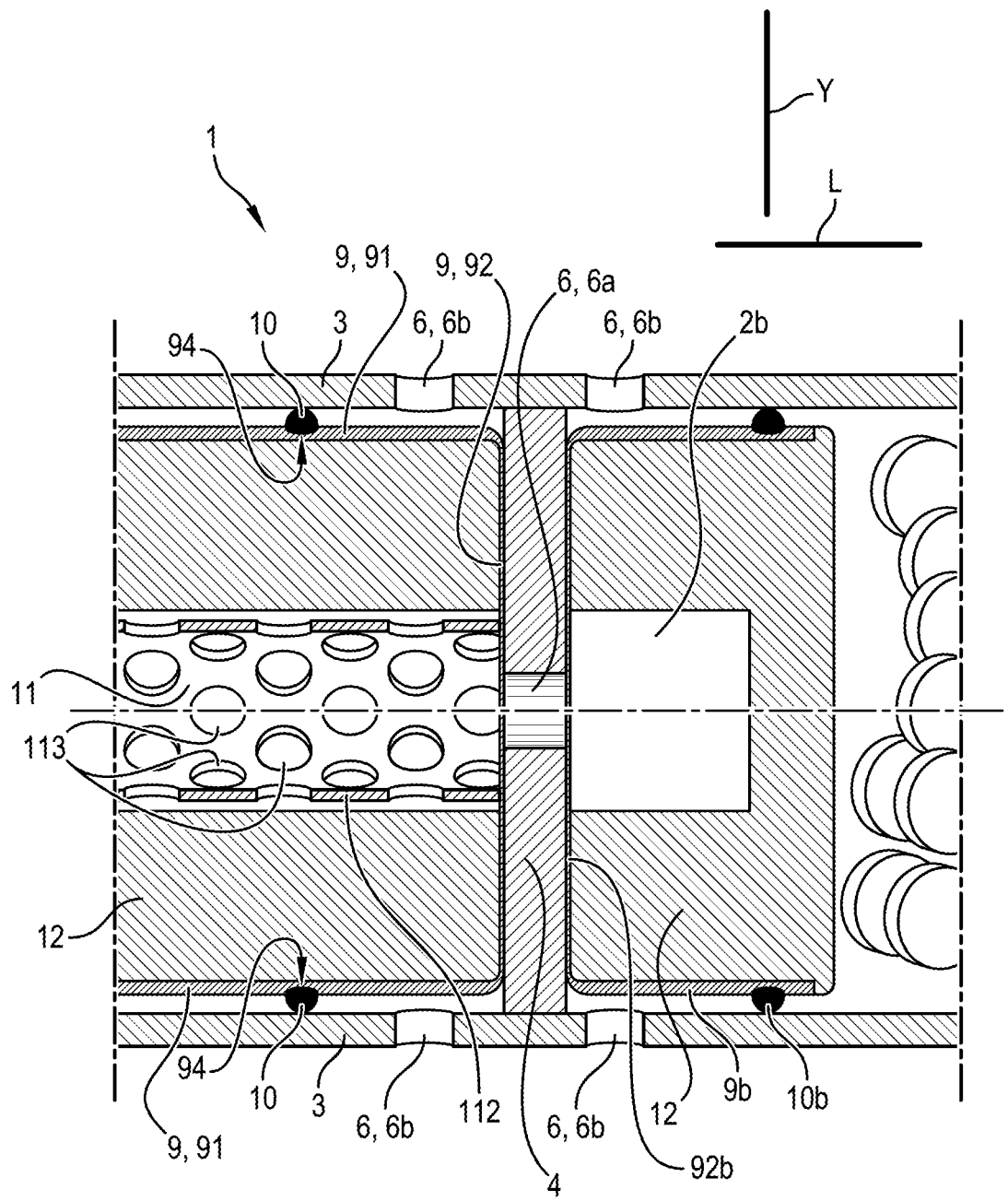

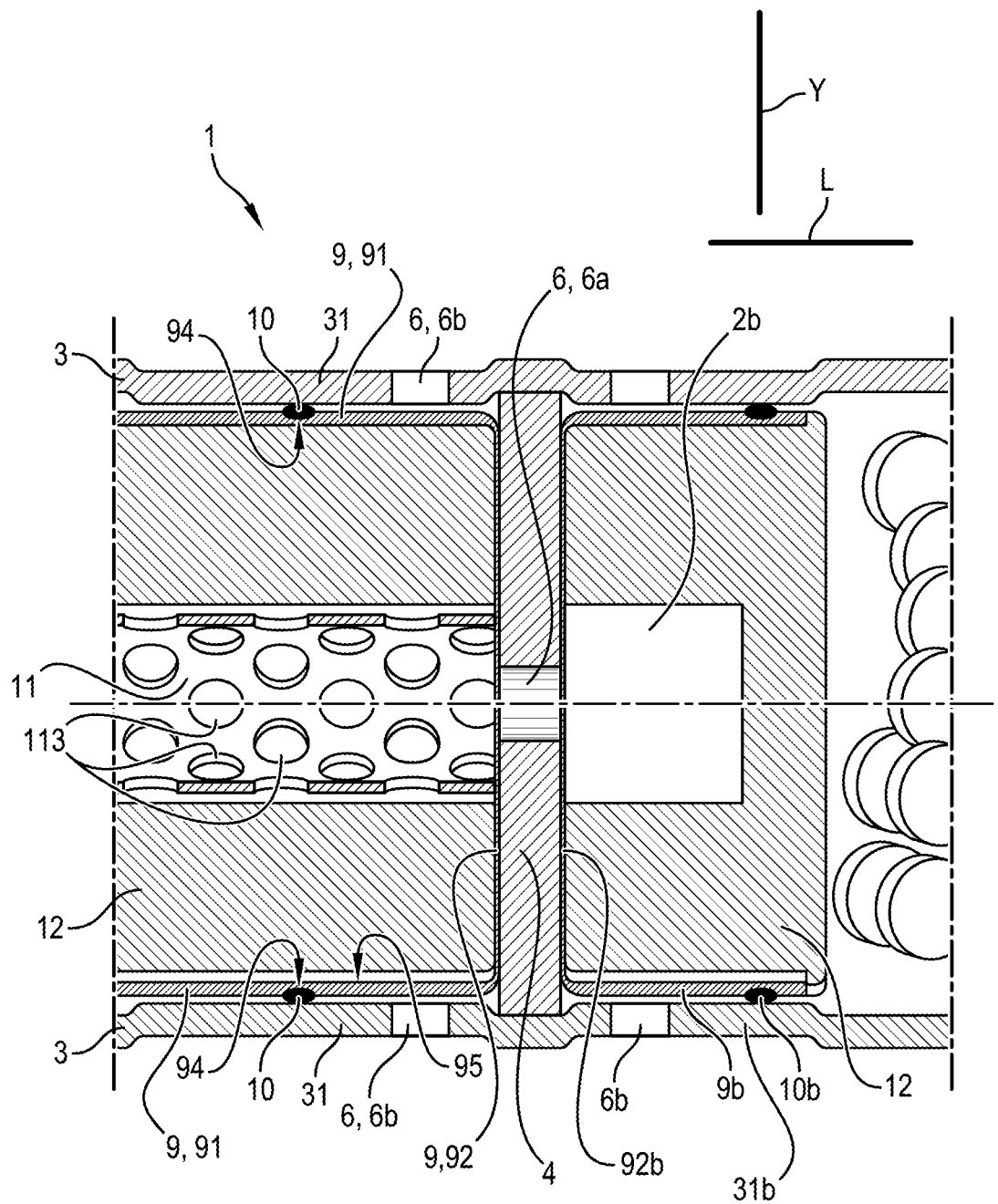

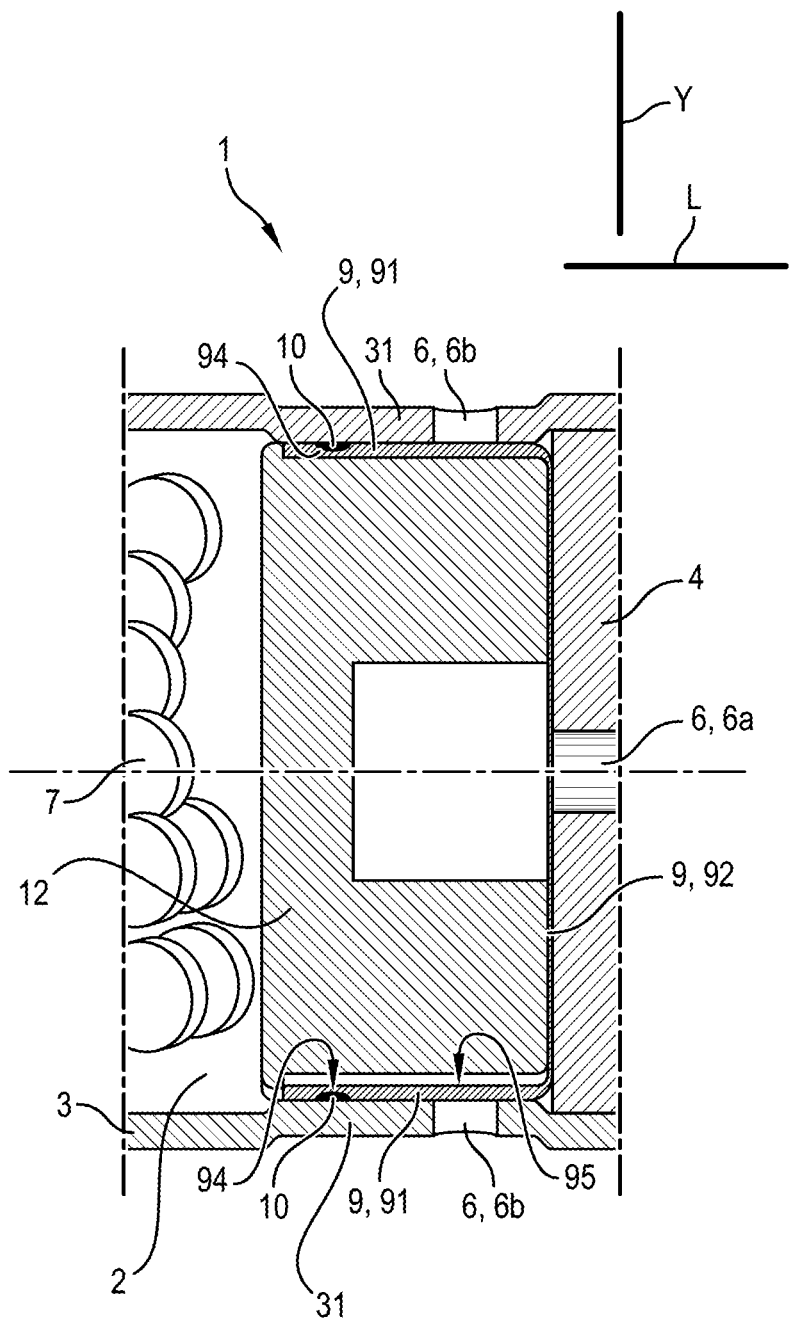

GAS GENERATOR AND ITS MANUFACTURING PROCESS

CROSS-REFERENCE TO RELATED APPLICATIONS

This application is a 371 U.S. National Stage of International Application No. PCT/EP2011/056049, filed Apr. 15, 2011 and published in English as WO 2011/131590 A1 on Oct. 27, 2011, which claims priority to French Patent Application No. 1052996, filed Apr. 20, 2010. The disclosures of the above applications are incorporated herein by reference.

FIELD

The invention relates to a gas generator having at least one pyrotechnic charge contained in at least one chamber, the combustion of which has to generate gas to the outside of the chamber.

BACKGROUND

A field of application of the invention is automobile security, especially for generating gas serving to inflate an inflatable airbag for protection of a person in a vehicle in the event of shock.

The pyrotechnic charge located in the chamber is ignited by an ignition device to generate gas. Combustion of this pyrotechnic charge releases gas which escapes via a through-hole to the outside of the chamber.

The through-hole is initially closed by a lid sealing the chamber relative to the exterior. The rise in pressure of combustion gases inside the chamber breaks the lid to admit combustion gas of the pyrotechnic charge into the through-hole to the outside of the chamber.

Different types of devices for sealing the chamber are known.

This sealing is necessary so that the pyrotechnic charge contained in the chamber retains its properties of combustion and to prevent it becoming contaminated by external particles or humidity or preventing particles of the pyrotechnic charge from escaping to the outside of the chamber.

A first type of sealing device consists of sticking a sheet against the inner surface of the chamber over the through-hole.

This technique is however difficult to implement due to the fact that the outer wall delimiting the chamber is usually tubular and larger in size than its transversal walls, which makes the chamber oblong and narrow and leaves little place for carrying out adhesion. This technique can cause a substantial rebut rate or considerable costs.

A second type of sealing device consists of doubling with a metallic sheet in the form of a box ("lid box") the tubular wall and the transversal inner wall delimiting the chamber to reclose the box against a seal gasket borne by the other lateral wall bearing the igniter. But, in the case of a generator whereof the length is much greater than the diameter, it is difficult to manufacture boxes with a constant and controlled thickness of material. In fact, the sheet serves as cap against the through-hole and is a critical component whose thickness defines the uncapping pressure and the uncapping time of the hole after ignition.

Consequently, the result is a thickness of sheet which is predefined and weak enough for the sheet to be able to yield to a gas pressure which is not too high.

In a general manner, it is difficult to make a very long box from a sheet of slight thickness (with a thickness controlled laterally).

SUMMARY

The invention aims to rectify the disadvantages of the prior art by producing a gas generator having the level of sealing required in the chamber for proper functioning of the generator, by means of a simple and robust manufacturing process.

For this purpose, a first subject matter of the invention is a gas generator, including at least one pyrotechnic charge contained in at least one chamber delimited by a first outer tubular wall and by at least second and third transversal walls transverse to the first wall, at least one of the first and second walls including at least one through-hole for letting through combustion gases of the pyrotechnic charge from the chamber towards the outside of the chamber, at least one covering sheet being located facing the through-hole, the covering sheet being in the shape of a box inserted inside the chamber and including a first tubular part located facing at least one part of the first tubular wall, the first tubular part of the sheet being closed on one side by a second transversal part of the sheet located facing the second transversal wall, at least one seal gasket being provided between the covering sheet and one of the walls for ensuring the seal of the chamber towards the through-hole, the covering sheet being capable of yielding upon combustion of the pyrotechnic charge for letting through the combustion gases of the pyrotechnic charge into the through-hole, characterized in that the seal gasket is positioned between the first tubular part of the covering sheet and the first outer tubular wall of the chamber for ensuring the seal between the box and the first outer tubular wall towards the through-hole.

According to an embodiment of the invention, the seal gasket is housed in a peripheral recess provided on the first tubular part of the covering sheet.

According to an embodiment of the invention, the seal gasket is housed in a peripheral groove of the first tubular part of the covering sheet.

According to an embodiment of the invention, the first outer tubular wall of the chamber is crimped against the seal gasket.

According to an embodiment of the invention, the first tubular part of the sheet in the form of a box is facing one part only of the first outer tubular wall and is at a distance from the third transversal wall.

According to an embodiment of the invention, the through-hole is in the second transversal wall.

According to an embodiment of the invention, the through-hole is arranged in a zone of the first outer tubular wall, which is facing a zone of the first tubular part of the covering sheet situated between the seal gasket and the second transversal wall.

According to an embodiment of the invention, there is at least one said through-hole located in the second transversal wall and at least one other said through-hole arranged in a zone of the first outer tubular wall, located facing a zone of the first tubular part of the covering sheet situated between the seal gasket and the second transversal wall.

According to an embodiment of the invention, the first outer tubular wall comprises a zone crimped against the seal gasket, the crimped zone having an inner transversal dimension greater than or equal to the outer transversal dimension of the first tubular part of the covering sheet.

A second subject matter of the invention is a manufacturing process of a gas generator such as described hereinabove, characterised in that the seal gasket is inserted into a peripheral recess of the first tubular part of the covering sheet, this first tubular part of the covering sheet having an outer transversal dimension less than the inner transversal dimension of the first outer tubular wall and the seal gasket having an outer transversal dimension greater than the outer transversal dimension of the first tubular part of the covering sheet and less than the inner transversal dimension of the first wall, the assembly formed by the covering sheet and the seal gasket is inserted into the first outer tubular wall against the second transversal wall, so that the covering sheet is facing the through-hole, crimping on the first outer tubular wall is performed at the seal gasket to reduce the inner transversal dimension of the first outer tubular wall to compress the seal gasket in the recess.

BRIEF DESCRIPTION OF THE DRAWINGS

The invention will be better understood from the following description, given solely by way of non-limiting example in reference to the attached drawings, in which:

FIG. 2 is a schematic view in longitudinal section of a gas generator according to the invention prior to crimping, FIG. 3 is a schematic view in longitudinal section of the gas generator as per FIG. 2 after crimping, FIG. 4 is a schematic view in longitudinal section of a variant of the gas generator according to the invention.

DETAILED DESCRIPTION

Figure 1:
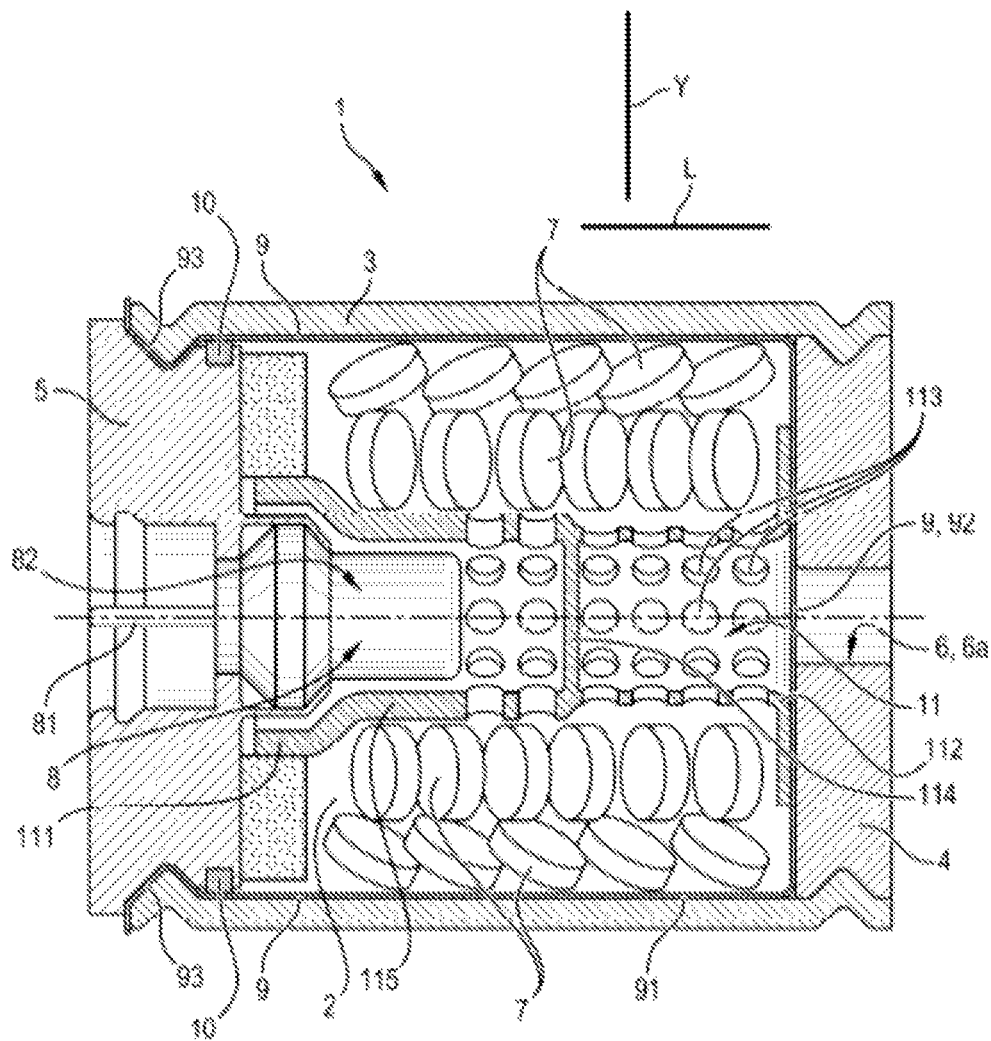
FIG. 1 is a schematic view in longitudinal section of an example of gas generator known from the prior art.

In FIG. 1, the gas generator 1 comprises a chamber 2 delimited by a first outer tubular wall 3, extending for example in a longitudinal direction L, and by two transversal walls 4, 5 distant from each other and extending transversally to the extension direction L of the tubular wall 3.

The second transversal wall 4 comprises a through-hole 6. The chamber 2 contains a pyrotechnic charge 7 which can be in the form of pellets, monolithic block or other. The pyrotechnic charge is a propellant for generating gas during its combustion. For this purpose, an ignition device 8 or igniter 8 is provided in the chamber 2, for example in the form of an electro-pyrotechnic initiator. This igniter 8 is able to be triggered from the outside, for example by electric control pins 81 in the case of an initiator. Sending an electric control signal to the pins 81 causes ignition of a second pyrotechnic charge contained in a cap 82 of the igniter 8 which generates hot particles in the chamber 2 to ignite the pyrotechnic charge 7. The igniter 8 is maintained in the third transversal wall 5.

A covering sheet 9 in the form of a box or lid box 9 is provided against the first wall 3 and against the second transversal wall 4 to ensure sealing of the chamber 2 in the direction of the through-hole 6. In the device known from FIG. 1, the sheet 9 in the form of a box comprises a first tubular part extending all along the first wall 3 inside the latter, this first tubular part 91 of the box connecting on the side of the wall 4 to a second part 92 located facing the hole 6. The end 93 of the sheet 9 in the form of a box, at a distance from the bottom part 92 of the box, that is, the free end 93 of the box 9, surrounds the third transversal wall 5 on its periphery. This transversal wall 5 comprises a peripheral groove housing a seal gasket 10 to ensure sealing between the wall 5 and the box 9. The first wall 3 and the end 93 of the box 9 are crimped to ensure fixing around the wall 5.

Combustion of the pyrotechnic charge 7 in the chamber 2 causes a rise in pressure in the latter against the sheet 9, which from a certain pressure readily breaks the covering sheet 9 at the hole 6. The combustion gases of the charge 7 pass through the sheet 9 and the hole 6 to the outside of the chamber 2.

Then, one can see that such a box 9 is difficult to manufacture over a great length of the tubular wall 3 and a small transversal width of the part 92, as is often the case for gas generators of generally oblong shape in the longitudinal direction L, the figures not showing on the same scale the dimensions in the longitudinal direction L and in the transverse direction Y perpendicular to the longitudinal direction L, given that the transversal dimensions in the transverse direction Y are shown larger than the longitudinal dimensions in the direction L for the sake of clarity.

Embodiments of the invention in reference to FIGS. 2, 3 and 4 are described hereinbelow, where the same elements as in FIG. 1 bear the same reference numerals with the additional characteristics indicated hereinbelow.

In FIGS. 2, 3 and 4, on its outer surface turned towards the first wall 3 the first tubular part 91 of the sheet 9 in the form of a box comprises a peripheral recess 94 in which the peripheral seal gasket 10 is inserted. This recess 94 is defined by a change in transversal cross section of the first tubular part 91 of the sheet 9. This peripheral recess 94 is for example in the form of a peripheral groove 94 of the first tubular part 91 of the sheet 9. This recess 94 can comprise an edge on either side of the gasket 10. Below, the groove 94 can also be generalised to a recess 94.

The tubular part 91 of the sheet 9 in the form of a box does not need to occupy the entire length of the first wall 3 but can be shorter than this wall 3 in the longitudinal direction L by starting out from the lateral base part 92 of the box 9. Then, in an embodiment according to the invention, the tubular part 91 of the film 9 in the form of a box is facing one part only of the length of the tubular wall 3 by being at a distance from the second transversal wall 5.

The annular groove 94 helps to maintain the seal gasket 10 on the tubular part 91 of the sheet 9 in the form of a box. In FIG. 3, swaging or necking 31 of the wall 3 is formed on the gasket 10, as is described hereinbelow.

To assemble the gas generator, during a first step the gasket 10 is first placed in the groove 94 around the tubular part 91 of the box 9.

Next, during a second step, the assembly of the box 9 and the gasket 10 carried by the latter is inserted inside the tubular wall 3 through the opening of the wall 3 not yet assembled with the wall 5. The transversal part 92 of the sheet 9 in the form of a box is now against the second transversal wall 4 fixed inside the wall 3.

In this second step, the tubular part 91 of the sheet 9 has an outer transversal dimension (outside the groove 94), less than the inner transversal dimension of the wall 3, such that the tubular part 91 is at a distance from the wall 3.

The outer transversal dimension of the tubular part 91 and the transversal thickness of the gasket 10 are defined such that when the sheet 9 is inserted in the chamber 2, the outer transversal dimension of the seal gasket 10 is less than the inner transversal dimension of the wall 3, the gasket 10 now being at a distance from the tubular wall 3 during insertion.

During this insertion, the outer transversal dimension of the gasket 10 is greater than the outer transversal dimension of the tubular part 91 of the sheet 9 in the form of a box.

Next, during a third step in FIG. 3, crimping of the tubular wall 3 is carried out at the seal gasket 10. This crimping reduces the outer and inner transversal dimension of the wall 3 to apply a zone 31 of the wall 3 against the gasket 10. The inner surface of the peripheral crimped zone 31 of the wall 3 then compresses the gasket 10 against the tubular part 91 of the sheet 9, the gasket 10 being made of compressible material such as for example rubber or other, the wall 3 and the sheet 9 being metallic with the sheet 9 having a lesser thickness than that of the wall 3. The sheet 9 is copper for example. The wall 4 is also metallic for example. This crimping is for example carried out so that the crimped part 31 of the wall 3 touches the gasket 10 without reducing the outer transversal dimension of the tubular part 91 of the sheet 9, so as not to deform the box 9 and not to affect its sealing. Optionally, the inner transversal dimension of the crimped part 31 can be greater than the outer transversal dimension of the tubular part 91, so that the crimped part 31 does not touch the box 9, or the crimped zone 31 can lightly touch the tubular part 91 and have an inner transversal dimension of the crimped zone 31 equal to the outer transversal dimension of the tubular part 91.

The through-hole 6 is for example provided in the second transversal wall 4, as is shown in FIGS. 2, 3 and 4. Of course, several through-holes 6 could be provided in the transversal wall 4.

The hole or the holes 6 in the transversal wall 4 serve for example to admit combustion gas from the chamber 2 to another inner compartment 2b of the generator 2, located for example in the extension of the wall 3, this hole or these holes 6 being designated by reference numeral 6a.

In FIGS. 3 and 4, in the first wall 3 is also provided a through-hole 6 facing the tubular part 91 of the box 9. Several through-holes 6 are provided in the wall 3 for example. This hole or these holes 6 on the wall 3 are designated by reference numeral 6b to distinguish them from the hole or holes 6a of the transversal wall 4 which communicates with an adjacent chamber 2b. This hole or these holes 6b on the wall 3 serve to let through gases from the chamber 2 to the outside of the generator 1. The holes 6b of the wall 3 are for example distributed over the periphery of the wall 3. There is at least one through-hole 6a in the second transversal wall 4 and at least one other so-called through-hole 6b arranged in a zone of the first outer tubular wall 3 facing a zone 95 of the first tubular part 91 of the covering sheet 9 located between the seal gasket 10 and the second transversal wall 4.

Of course, another box 9b and another gasket 10b similar to the box 9 and gasket 10 can also be provided on the other side of the wall 4 (that is, the side away from the chamber 2) in the other compartment 2b of the generator with the base 92b of the other box 9b against this wall 4 and the crimping 31b similar to the crimping 31, as is shown by way of example in FIGS. 2 and 3.

In FIGS. 1, 2 and 3, reference numeral 11 designates a drainage tube for gases generated by ignition of the igniter 8 and of the pyrotechnic charge 7. This drainage device 11 is formed by a tube at one end 111 of which is the igniter 8 and the other end 112 of which is against the part 92. Over its length between the ends 111 and 112, the tube 11 comprises through-holes 113 for having the interior of the tube 11 communicate with the pyrotechnic charge 7 located outside of the tube 11 in the chamber 2. The tube 11 comprises a transversal wall 114 between the igniter 8 and the part 92 located facing the hole 6a, with holes 113 located on the longitudinal part 115 of the tube 111 located between the igniter 8 and the wall 114 and/or between the end 11 and the wall 114 so that it is the rise in pressure of combustion gases from the pyrotechnic charge 7 which opens the part 92 and not directly the igniter 8.

As is shown in FIG. 4, a combustion gas condenser 12 can be provided in the chamber 2 in the base of the box 9 against its transversal part 92 and its tubular part 91. In FIGS. 2 and 3, this condenser 12 can be provided in the box 9 on the other side of the chamber 2 behind the transversal wall 4.

The tubular wall 3 and the tubular part 91 are for example cylindrical, especially of circular transversal section. The walls 4, 5 are for example circular.

Sealing tests on the chamber 2 filled with gas containing a minimum 10% of helium with the device according to the invention in the chamber 2 have shown leakage from the chamber 2 representing a rate of less than $1.10^{-5}$ mbar·l/s.

The invention claimed is:

1. A gas generator comprising:
at least one pyrotechnic charge contained in at least one chamber delimited by a first outer tubular wall and by at least second and third transversal walls transverse to the first wall, at least one of the first and second walls including at least one through hole for letting through combustion gases of the pyrotechnic charge from the chamber towards the outside of the chamber, wherein the first outer tubular wall is an outermost tubular component of the gas generator;
at least one covering sheet located facing the through hole, the at least one covering sheet in a shape of a box inserted inside the chamber and including a first tubular part located facing at least one part of the first tubular wall, the first tubular part of the sheet closed on one side by a second transversal part of the sheet located facing the second transversal wall; and
at least one seal gasket provided between the at least one covering sheet and one of the walls isolating the pyrotechnic charge from the through hole, the at least one covering sheet capable of yielding upon combustion of the pyrotechnic charge for letting through the combustion gases of the pyrotechnic charge into the through hole, the seal gasket positioned between the first tubular part of the at least one covering sheet and the first outer tubular wall of the chamber for ensuring the seal between the box and the first outer tubular wall towards the through hole.

2. The gas generator of claim 1, wherein the seal gasket is housed in a peripheral recess provided on the first tubular part of the covering sheet.

3. The gas generator of claim 1, wherein the seal gasket is housed in a peripheral groove of the first tubular part of the covering sheet.

4. The gas generator of claim 1, wherein the first outer tubular wall of the chamber is crimped against the seal gasket.

5. The gas generator of claim 1, wherein the first tubular part of the sheet in a form of a box is facing one part only of the first outer tubular wall and is at a distance from the third transversal wall.

6. The gas generator of claim 1, wherein the through hole is in the second transversal wall.

7. The gas generator of claim 1, wherein the through hole is arranged in a zone of the first outer tubular wall, which is facing a zone of the first tubular part of the covering sheet situated between the seal gasket and the second transversal wall.

8. The gas generator of claim 1, wherein at least a first through hole is located in the second transversal wall and at least a second through hole is arranged in a zone of the first outer tubular wall, located facing a zone of the first tubular part of the covering sheet situated between the seal gasket and the second transversal wall.

9. The gas generator of claim 1, wherein the first outer tubular wall comprises a crimped zone crimped against the seal gasket, the crimped zone having an inner transversal dimension greater than or equal to an outer transversal dimension of the first tubular part of the covering sheet.

10. A method of manufacturing the gas generator of claim 1, the method comprising:
inserting the seal gasket into a peripheral recess of the first tubular part of the covering sheet, the first tubular part of the covering sheet having an outer transversal dimension less than an inner transversal dimension of the first outer tubular wall and the seal gasket having an outer transversal dimension greater than the outer transversal dimension of the first tubular part of the covering sheet and less than an inner transversal dimension of the first wall;
inserting an assembly formed by the covering sheet and the seal gasket into the first outer tubular wall against the second transversal wall, so that the covering sheet is facing the through hole; and
crimping on the first outer tubular wall at the seal gasket to reduce an inner transversal dimension of the first outer tubular wall to compress the seal gasket in the recess.

11. The gas generator of claim 1, further comprising a tube disposed radially inward relative to the first tubular wall and the covering sheet and including another through hole in communication with the chamber.

12. The gas generator of claim 11, wherein the tube receives gases generated by ignition of an igniter and is disposed within the covering sheet.

13. The gas generator of claim 1, further comprising a combustion gas condenser disposed within the covering sheet.

14. A gas generator comprising:
a chamber defined by a first tubular wall, a second transversal wall transverse to the first tubular wall and disposed at one end of the chamber, and a third transversal wall transverse to the first tubular wall and disposed at another end of the chamber, one of the first and second walls including a first hole through which combustion gases of a pyrotechnic charge may discharge from the chamber, wherein the first tubular wall is an outermost tubular component of the gas generator;
a covering sheet disposed within the chamber and facing the first hole, the covering sheet including a first tubular part and a second transversal part, the first tubular part facing the first tubular wall and closed on one end by the second transversal part, the second transversal part facing the second transversal wall; and
a seal gasket provided between the first tubular part of the covering sheet and the first tubular wall sealing the chamber and isolating the pyrotechnic charge from the first hole, the covering sheet adapted to yield upon combustion of the pyrotechnic charge to allow the combustion gases of the pyrotechnic charge through the first hole.

15. The gas generator of claim 14, wherein the seal gasket is housed in a peripheral groove or a peripheral recess of the first tubular part of the covering sheet.

16. The gas generator of claim 14, wherein the first tubular wall of the chamber is crimped against the seal gasket.

17. The gas generator of claim 14, wherein the first hole extends through the second transversal wall.

18. The gas generator of claim 14, wherein the first hole is disposed in a zone of the first tubular wall that is facing a zone of the first tubular part of the covering sheet situated between the seal gasket and the second transversal wall.

19. The gas generator of claim 14, wherein the first hole extends through the second transversal wall and another hole extends through the first tubular wall in a zone of the first tubular wall that faces a zone of the first tubular part of the covering sheet situated between the seal gasket and the second transversal wall.

20. The gas generator of claim 14, wherein the first tubular wall comprises a crimped zone crimped against the seal gasket, the crimped zone having an inner transversal dimension that is equal to an outer transversal dimension of the first tubular part of the covering sheet.

21. A method of manufacturing the gas generator of claim 14, the method comprising:
inserting the seal gasket into a peripheral recess of the first tubular part of the covering sheet, the first tubular part of the covering sheet having an outer transversal dimension less than an inner transversal dimension of the first tubular wall and the seal gasket having an outer transversal dimension greater than the outer transversal dimension of the first tubular part of the covering sheet and less than the inner transversal dimension of the first tubular wall;
inserting an assembly formed by the covering sheet and the seal gasket into the first tubular wall against the second transversal wall, so that the covering sheet is facing the first hole; and
crimping on the first tubular wall at the seal gasket to reduce the inner transversal dimension of the first tubular wall to compress the seal gasket in the recess.

22. The gas generator of claim 14, further comprising a combustion gas condenser disposed within the covering sheet.

23. The gas generator of claim 14, further comprising a tube disposed radially inward relative to the first tubular wall and the covering sheet and including another through hole in communication with the chamber.

24. The gas generator of claim 23, wherein the tube receives gases generated by ignition of an igniter and is disposed within the covering sheet.

* * * * *